(12) United States Patent
Deng et al.

(10) Patent No.: US 8,472,229 B2
(45) Date of Patent: Jun. 25, 2013

(54) ARRAY-BASED INTEGRATED CIRCUIT WITH REDUCED PROXIMITY EFFECTS

(71) Applicant: Texas Instruments Incorporated, Dallas, TX (US)

(72) Inventors: Xiaowei Deng, Plano, TX (US); Wah Kit Loh, Richardson, TX (US); Anand Seshadri, Richardson, TX (US); Terence G. W. Blake, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/655,512

(22) Filed: Oct. 19, 2012

(65) Prior Publication Data
US 2013/0044536 A1 Feb. 21, 2013

Related U.S. Application Data

(62) Division of application No. 12/913,479, filed on Oct. 27, 2010, now abandoned.

(51) Int. Cl.
*G11C 5/02* (2006.01)
*G06F 17/50* (2006.01)

(52) U.S. Cl.
USPC ............ 365/51; 365/63; 365/156; 365/154; 716/55; 716/122; 716/119; 716/118

(58) Field of Classification Search
USPC ................. 365/154, 156, 51, 63, 72; 716/55, 716/50, 115, 119, 121, 122, 118
See application file for complete search history.

(56) References Cited

U.S. PATENT DOCUMENTS 5,466,623 A * 11/1995 Shimizu et al. ............... 438/241
7,765,516 B2    7/2010 Aton et al.
8,218,376 B2 *  7/2012 Seshadri et al. .......... 365/189.09

OTHER PUBLICATIONS

Drennan et al., "Impilcations of Proximity Effects for Analog Design", Paper 8.6, Custom Integrated Circuits Conference (IEEE, 2006).
Radojcic et al., "Design for Manufacturability for Fabless Manufacturers", Solid State Circuit Magazine (IEEE, Summer 2009); pp. 24-33.
Lin, "Layout Proximity Effects and Device Extraction in Circuit Designs", 9th Annual International Conference on Solid-State and Integrated-Circuit Technology (IEEE, 2008), pp. 2228-2231.

* cited by examiner

*Primary Examiner* — Andrew Q Tran
(74) *Attorney, Agent, or Firm* — Rose Alyssa Keagy; Wade J. Brady, III; Frederick J. Telecky, Jr.

(57) ABSTRACT

An integrated circuit and method of generating a layout for an integrated circuit in which circuitry peripheral to an array of repetitive features, such as memory or logic cells, is realized according to devices constructed similarly as the cells themselves, in one or more structural levels. The distance over which proximity effects are caused in various levels is determined. Those proximity effect distances determine the number of those features to be repeated outside of and adjacent to the array for each level, within which the peripheral circuitry is constructed to match the construction of the repetitive features in the array.

10 Claims, 9 Drawing Sheets

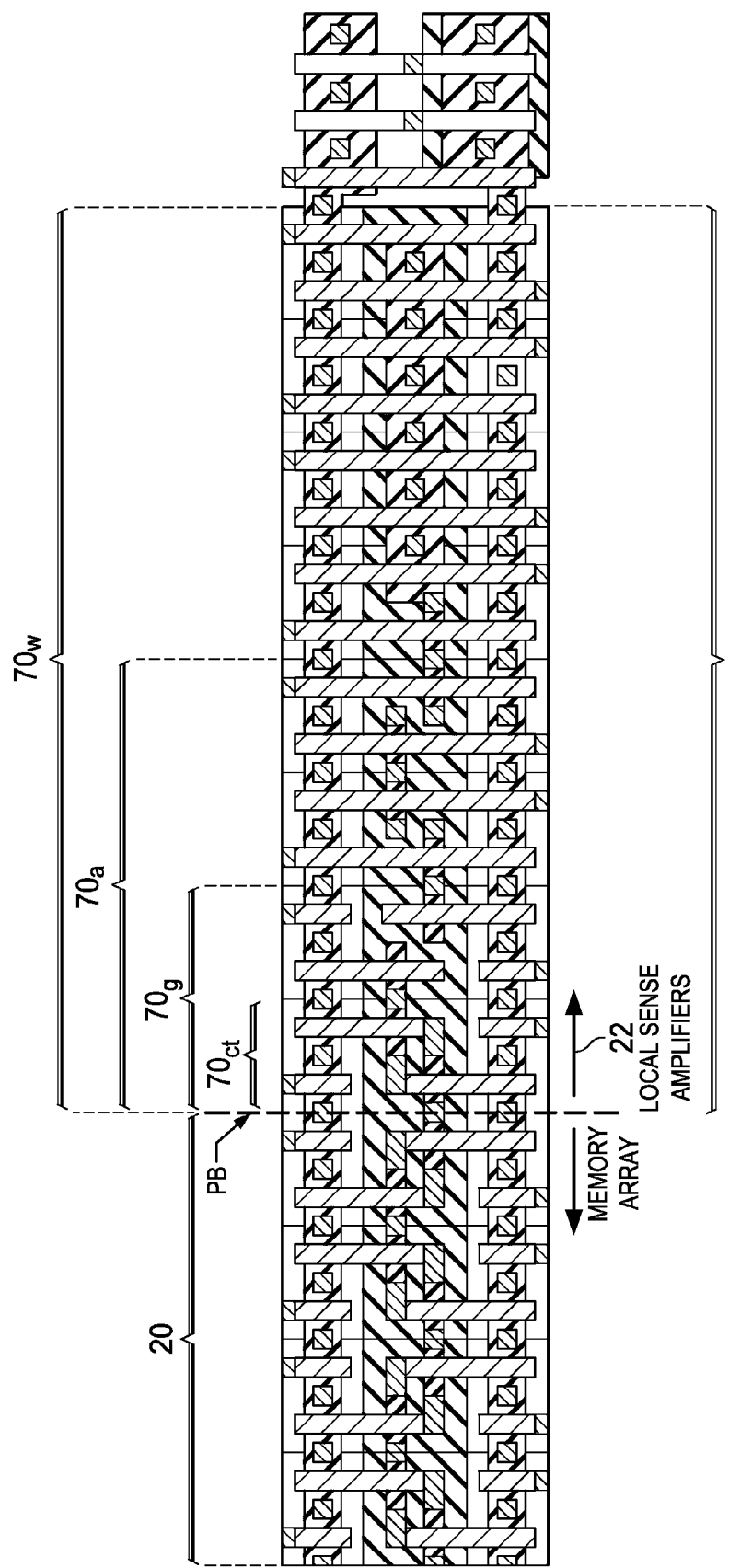

ARRAY-BASED INTEGRATED CIRCUIT WITH REDUCED PROXIMITY EFFECTS

CROSS-REFERENCE TO RELATED APPLICATIONS

This application is a division of application Ser. No. 12/913,479, filed Oct. 27, 2010, the contents of which are hereby incorporated by reference.

STATEMENT REGARDING FEDERALLY SPONSORED RESEARCH OR DEVELOPMENT

Not applicable.

BACKGROUND OF THE INVENTION

This invention is in the field of solid-state integrated circuits, and is more specifically directed to the layout and arrangement of device arrays and peripheral circuitry in such integrated circuits.

Many modern electronic devices and systems now include substantial computational capability for controlling and managing a wide range of functions and useful applications. The computational power of these modern devices and systems is typically provided by one or more processor "cores". These processor cores operate as a digital computer, in general retrieving executable instructions from memory, performing arithmetic and logical operations on digital data retrieved from memory, and storing the results of those operations in memory. Other input and output functions for acquiring and outputting the data processed by the processor cores are performed as appropriate. Considering the large amount of digital data often involved in performing the complex functions of these modern devices, significant solid-state memory capacity is now commonly implemented in the electronic circuitry for these systems.

Modern solid-state memory is realized by various memory technologies. Static random access memory (SRAM) has become the memory technology of choice in many modern power-conscious electronic systems. As is fundamental in the art, SRAM cells store contents "statically", in that the stored data state remains latched in each cell so long as power is applied to the memory. Typically, each SRAM cell is constructed as a cross-coupled pair of inverters. Another solid-state memory type is referred to as dynamic RAM (DRAM), which realizes each memory cell as a single capacitor in combination with a single pass transistor for selectively coupling one of the capacitor plates to a bit line, for read and write access. DRAM technology attains higher memory density (bits per unit area), but requires periodic refreshing (read followed by write back) to retain the stored data state. Various types of non-volatile memory, including mask-programmable read-only memory (ROM), electrically erasable programmable read-only memory (EEPROM), ferroelectric RAM (FeRAM, or FRAM), and the like are well-known in the art.

Advances in semiconductor technology in recent years have enabled the shrinking of minimum device feature sizes, such as metal-oxide-semiconductor (MOS) transistor gates, into the sub-micron range. This miniaturization is especially beneficial when applied to memory arrays, because of the large proportion of the overall chip area often devoted to on-chip memories. As a result, significant memory resources are now often integrated as embedded memory into larger-scale integrated circuits, such as microprocessors, digital signal processors, and "system-on-a-chip" integrated circuits.

Electrical effects dependent on the proximity and structure of neighboring devices have been observed in transistors constructed with deep sub-micron feature sizes (e.g., gate widths of 90 nm and below). Various causes and manifestations of these "proximity" effects have been characterized. These various proximity effects have been observed to impart significant variations in drain-to-source current of MOS transistors.

One type of proximity effect is known in the art as the "well proximity effect", as described in Drennan et al., "Implications of Proximity Effects for Analog Design", Paper 8.6, Custom Integrated Circuits Conference (IEEE, 2006). As described in that paper, this effect is caused by the scattering of dopant atoms from edges of the photoresist mask used to form doped wells in MOS integrated circuits. Because of this scattering, the channel regions of transistors nearer to the edge of the well are doped to a higher surface concentration than for those transistors farther away from the well edge. This effect appears as variations in threshold voltage and other electrical characteristics.

Other proximity effects include those due to lithographic proximity in the polysilicon gate level, in which the photolithographic patterning of a polysilicon gate structure is affected by other nearby gate structures. Regularity in gate spacing and width is known to reduce variation due to lithographic proximity effects. Lithographic proximity effects have also been observed at the contact level. In addition, nearby contact openings in overlying insulator films have been observed to affect strain effects in MOS transistors, depending on the stresses (i.e., compressive or tensile properties) in that overlying film.

By way of further background, recent advances in semiconductor technology as applied to integrated circuits include the use of "strain engineering" (or, alternatively, "stress engineering") in the manufacture of semiconductor device structures. It has been discovered that the tuning of strain in the crystal lattice of MOS transistor channel regions can enhance carrier mobility in those regions. As is fundamental in MOS device technology, the source/drain current (i.e., drive) of an MOS transistor in both the triode and saturation regions is proportional to carrier mobility in the channel region. In a general sense, compressive stress enhances hole mobility in the channel region of a p-channel MOS transistor, and tensile stress enhances electron mobility in the channel region of an n-channel MOS transistor. Typically, p-channel MOS transistors exhibit lower drive capability than n-channel MOS transistors in typical modern integrated circuits. As such, strain engineering techniques are more typically applied to p-channel MOS transistors than to n-channel MOS transistors, in current day manufacturing technology.

Various strain engineering approaches are known in the art. One approach is known as "embedded SiGe" (or "eSiGe"), in which the source and drain regions of a p-channel MOS transistor structure are etched from the silicon substrate or well region, and are replaced with a silicon-germanium alloy formed by selective epitaxy. Because of the germanium atoms within the silicon crystal lattice, the germanium constituting as much as 30% (atomic) of the alloy, eSiGe exhibits a larger lattice constant than does silicon (i.e., the distance between unit cells in the crystal lattice for SiGe is greater than in single-crystal silicon). Embedded eSiGe source/drain regions thus apply compressive stress to the channel region of the p-channel MOS transistor being formed. This compressive stress in the channel increases the hole mobility of the p-channel MOS transistor, and enhances its performance. Another conventional strain engineering approach known as "dual stress liner", or "DSL", technology involves the formation of a silicon nitride layer of either tensile or compressive characteristics over the active regions (i.e., source and drain regions) of transistors that are to receive the resulting stress. Tensile silicon nitride is used to enhance n-channel MOS transistors, and compressive silicon nitride is used to enhance p-channel MOS transistors. These strain engineering approaches have become important as device scaling has reached the very deep submicron regime (e.g., gate widths below 50 nm).

But at those small feature sizes, transistors become more sensitive to proximity effects. In addition, the effects of these strain engineering techniques often extend to neighboring devices and structures. Indeed, the performance enhancement mechanism of eSiGe technology essentially operates at a distance and can itself be considered as a "proximity effect", considering that the eSiGe source and drain regions impart a strain to the adjacent channel region, which is not formed of the alloy. Variations in the strain imparted to transistor channel regions resulting from variations in the layout of strain-producing structures thus must be considered.

One source of proximity effects caused by variations in mechanical strain imparted to MOS transistor channel regions is referred to in the above-cited Drennan et al. paper as the Shallow Trench Isolation stress effect. Strain variation due to this effect results from stresses within the shallow trench isolation structures that define active regions (e.g., source and drain regions) of MOS transistors. As known in the art, relatively thick isolation dielectric (e.g., silicon dioxide) structures at selected surface locations of the integrated circuit define semiconductor active regions into which MOS transistors and other semiconductor circuit elements are formed. In modern integrated circuits, particularly those in the sub-micron regime, this isolation dielectric is formed by a masked recess etch into the surface of the substrate (or silicon layer in a silicon-on-insulator environment), followed by deposition of a dielectric film such as silicon dioxide into those recesses. The deposited silicon dioxide in these "shallow trench isolation" structures can exhibit compressive or tensile properties, which can impart strain to the neighboring active regions including MOS transistor channel regions. The extent of this imparted strain has been observed to depend on the proximity of the transistor to the shallow trench isolation structure, as well as the volume of the isolation dielectric itself (i.e., the proximity and size of a neighboring active region on the other side of the isolation structure).

As known in the art, memory arrays involve a relatively large area of similar structures (i.e., the memory cells), and as such are conducive to being constructed in very regular fashion. This regularity in construction will, theoretically, reduce variation in array transistor performance due to proximity effects. However, those memory cells that are at the edges of a memory array are necessarily in a different structural environment than those in the center of the array. As such, variation in transistor performance between edge cells and cells interior to the array is often evident. In many memory designs, yield analysis has shown preponderance for data storage failures (failed read or failed write) for memory cells at array edges, as compared with interior cells.

A conventional approach for addressing this device variation between array edge cells and array interior cells is to construct "dummy" memory cells around the edges of the memory array. These dummy cells are constructed similarly as the memory cells themselves, but without electrical connection. Of course, the chip area required for these memory cells adds to the manufacturing cost of the integrated circuit containing the memory.

Other types of integrated circuit functions that are also constructed as an array or region of repetitive device structures, similarly suffer from device variations due to proximity effect. For example, many modern logic circuits are constructed as a "sea of gates" or another type of repetitive construction at lower levels in the integrated circuit structure. These logic circuits can be readily customized to realize a particular logic function at upper structural levels, such as in the routing of metal conductors to the transistors and gates. Proximity effects similarly result in transistor performance variation between transistors and gates at the edges of the repetitive structures, and those in the interior of the logic array.

BRIEF SUMMARY OF THE INVENTION

Embodiments of this invention provide an integrated circuit including an array of repetitive device structures, and a method of creating an integrated circuit layout of such an integrated circuit, in which proximity effects between array edge devices and interior devices are greatly reduced.

Embodiments of this invention provide such an integrated circuit and method that is suitable for application to solid-state memory functions, and to logic functions.

Embodiments of this invention provide such a solid-state memory and method that efficiently reduce proximity effects, without requiring dummy memory cells at array edges.

Embodiments of this invention provide such an integrated circuit and method that attain these benefits for devices constructed at deep submicron transistor feature sizes.

Other objects and advantages of embodiments of this invention will be apparent to those of ordinary skill in the art having reference to the following specification together with its drawings.

This invention may be implemented into a semiconductor integrated circuit, and a method of creating a layout for such an integrated circuit, in which a device array structure is extended for one or more structure levels beyond the array boundaries, including one or more of the well, active region, gate, and contact levels. The distance over which continuation of the array structure continues may differ from level to level. The design of peripheral circuitry to the array structure is constrained to fit within the structure defined by the extension of the one or more levels beyond the array.

BRIEF DESCRIPTION OF THE SEVERAL
VIEWS OF THE DRAWING

FIG. 7 illustrates, in plan view, a portion of the peripheral circuitry adjacent to the memory array in the random access memory of FIG. 2, according to embodiments of the invention.

DETAILED DESCRIPTION OF THE INVENTION

This invention will be described in connection with one or more of its embodiments, namely as implemented into an integrated circuit including a solid-state memory array, as it is contemplated that this invention will be especially beneficial when realized in that application. However, it is also contemplated that this invention can provide important benefit in other applications, for example in integrated circuits including a logic array, such as a regular array of transistors, gates, or logic cells. Accordingly, it is to be understood that the following description is provided by way of example only, and is not intended to limit the true scope of this invention as claimed.

Figure 1:
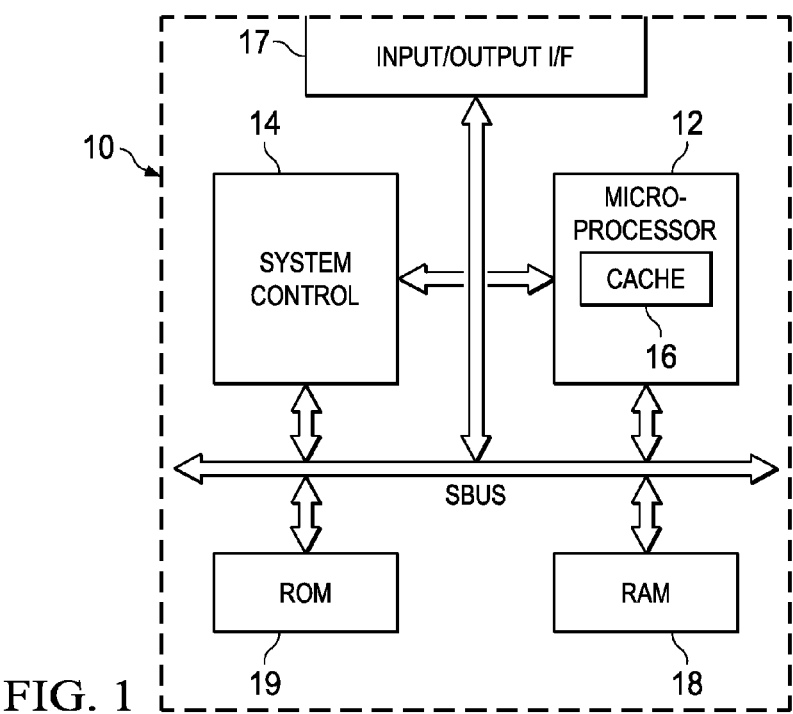
FIG. 1 is an electrical diagram, in block form, of an integrated circuit including memory resources, constructed according to embodiments of the invention.

FIG. 1 illustrates an example of large-scale integrated circuit 10, in the form of a so-called "system-on-a-chip" ("SoC"), as now popular in many electronic systems. Integrated circuit 10 is a single-chip integrated circuit into which an entire computer architecture is realized. As such, in this example, integrated circuit 10 includes a central processing unit of microprocessor 12, which is connected to system bus SBUS. Various memory resources, including random access memory (RAM) 18 and read-only memory (ROM) 19, reside on system bus SBUS and are thus accessible to microprocessor 12. Typically, ROM 19 serves as program memory, storing the program instructions executable by microprocessor 12, while RAM 18 serves as data memory; in some cases, program instructions may reside in RAM 18 for recall and execution by microprocessor 12. Cache memory 16 (such as level 1, level 2, and level 3 caches), typically implemented as static RAM (SRAM) provides another memory resource, and resides within microprocessor 12 itself and therefore does not require bus access. Other system functions are shown, in a generic sense, in integrated circuit 10 by way of system control 14 and input/output interface 17.

Those skilled in the art having reference to this specification will recognize that integrated circuit 10 may include additional or alternative functions to those shown in FIG. 1, or may have its functions arranged according to a different architecture from that shown in FIG. 1. The architecture and functionality of integrated circuit 10 is thus provided only by way of example, and is not intended to limit the scope of this invention.

As discussed above in connection with the Background of the Invention, modern integrated circuits constructed of transistors and other devices of sub-micron size can be vulnerable to proximity effects. To mitigate those proximity effects, circuit functions in large-scale integrated circuits such as integrated circuit 10 are best realized as arrays of regular features, repetitively placed. Memory resources, such as RAM 18, ROM 19, and cache memory 16, are naturally conducive to being constructed as arrays of essentially identical memory cells. In addition, many logic circuits, including a large portion of microprocessor 12 itself as well as logic in system control 14 can similarly be constructed as arrays of primitive or small-scale logic functions of essentially identical construction. For example, customizable logic functions can be constructed as an array of transistor or logic cells (i.e., potential logic gates), for which the routing of metal conductors determines the overall logic function realized by the array. Changes in the metal routing can be made relatively late in the manufacturing process, and as such provides great flexibility in manufacturing inventory control and also in the ability for customization. As such, according to this invention, one or more of the memory and logic arrays within integrated circuit 10 are constructed according to embodiments of the invention described below, in order to further reduce these proximity effects, particularly for memory cells and logic functions that reside near the edges of those arrays.

By way of example, embodiments of this invention will be described in this specification in connection with RAM 18. It is contemplated that those skilled in the art having reference to this specification, and the example of the application of embodiments of this invention to the memory array of RAM 18, can readily apply the invention in the construction of other types of memory, and in the construction of array-based logic and other integrated circuit functions.

Figure 2:
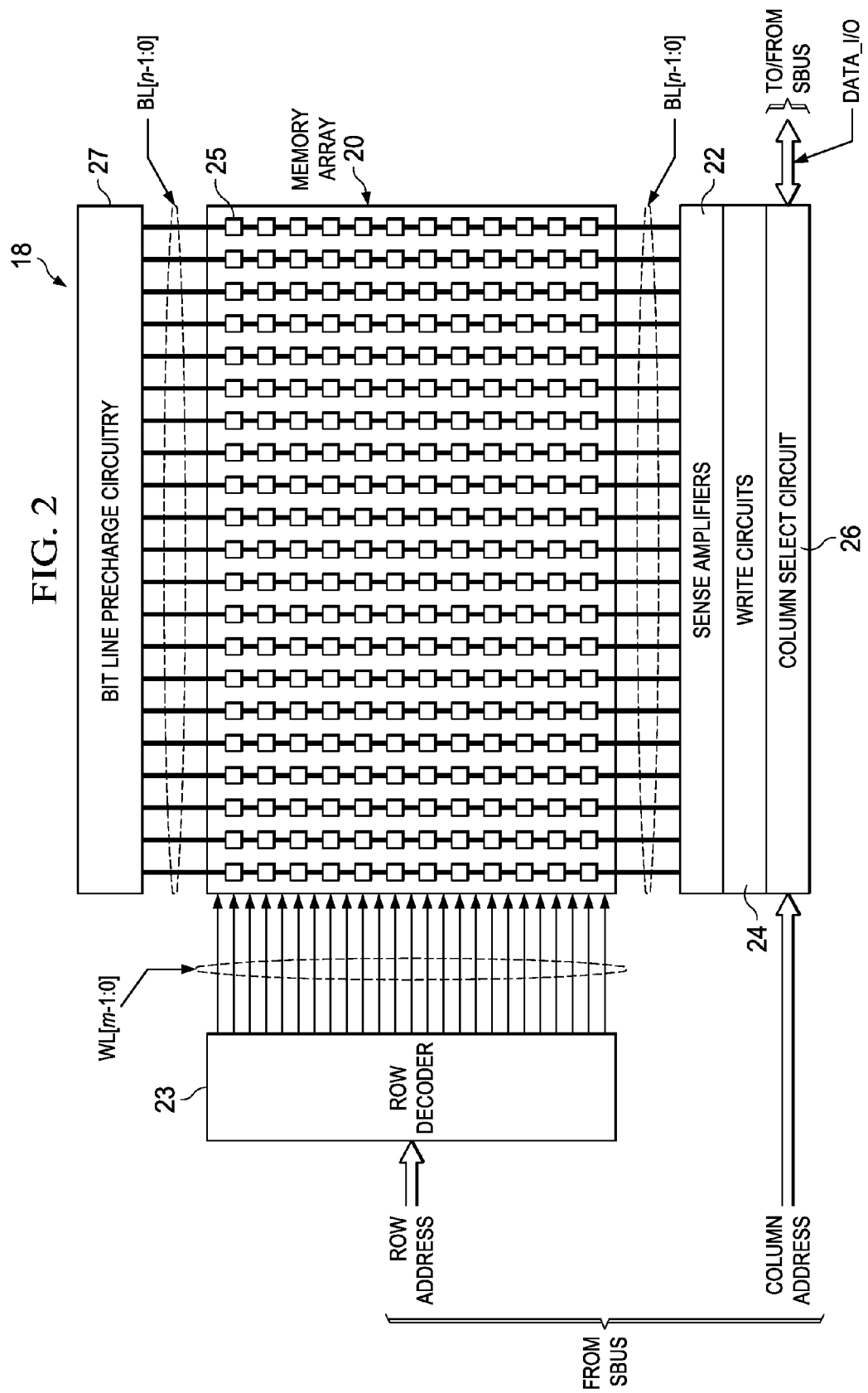
FIG. 2 is an electrical diagram, in block form, of a random access memory in the integrated circuit of FIG. 1, according to embodiments of the invention.

An example of the architecture of RAM 18 in integrated circuit 10 is illustrated in FIG. 2. Of course, a similar construction may be used to realize other memory resources such as cache memory 26; further in the alternative, RAM 18 may correspond to a stand-alone memory integrated circuit (i.e., not an embedded memory as shown in FIG. 1). Those skilled in the art having reference to this specification will comprehend that the memory architecture of RAM 18 in FIG. 2 is provided by way of example only, and that the actual architecture utilized in connection with embodiments of this invention is not of particular importance.

In addition, for purposes of this description and by way of example, RAM 18 will be described in the form of static random access memory (SRAM). However, it is contemplated that those skilled in the art having reference to this specification will readily recognize that this invention may be applied to a wide range of memory devices, including other types of static memory such as ferroelectric random access memories (FRAMs, or FeRAMs), dynamic random access memories (DRAMs), and the like. And, as mentioned above, this invention is also applicable to logic arrays and other circuit functions that can be realized in array fashion. Accordingly, it is to be understood that the following description is provided by way of example only, and is not intended to limit the true scope of this invention as claimed.

In the example shown in FIG. 2, RAM 18 includes many memory cells arranged in rows and columns within memory array 20. In this example, memory array 20 includes m rows and n columns of SRAM cells, each constructed identically with one another, for example by way of the well-known six transistor ("6-T") construction including cross-coupled CMOS inverters. Memory cells in the same column of memory array 20 share a pair of bit lines BL[n-1:0], and memory cells in the same row of memory array 20 share one of word lines WL[m-1:0]. Bit line precharge circuitry 27 is provided to apply a desired precharge voltage to the pairs of bit lines BL[n-1:0] in advance of read and write operations.

Row decoder 23 receives a row address value from bus SBUS (generally by way of memory control logic, not shown) indicating the row of memory array block 20 to be accessed, and includes word line drivers (not shown in FIG. 2) that energize the one of word lines WL[m-1:0] corresponding to that row address value.

In the column direction, pairs of bit lines BL[n-1:0] are coupled to a bank of local sense amplifiers 22, which operate in read operations to sense and amplify the differential signal presented on bit line pairs BL[n-1:0] by memory cells in the row selected by row decoder 23. Write circuits 24 are also disposed near memory array 20, and serve to drive one or both of the bit lines in bit line pairs BL[n-1:0] in write operations, to set the state of memory cells in the row selected by row decoder 23. In either case, column select circuit 26 receives a column address value, in response to which one or more columns (i.e., one or more of sense amplifiers 22 or write circuits 24) are selected for communication with bus DATA_I/O, by way of which input and output data are communicated between bus SBUS and the addressed memory cells within memory array 20, in the conventional manner.

Of course, many variations in the particular memory arrangement can be realized within this architecture, and by way of variations to this architecture, in connection with embodiments of the invention. In particular, the column read/write architecture can vary widely from that shown in FIG. 2, for example by inserting at least part of column select 26 between pairs of bit lines BL[n-1:0], on one hand, and sense amplifiers 22 and write circuits 24, on the other hand.

As is fundamental in the art, the manufacturing cost of an integrated circuit is closely related to the die area that it occupies; the number of potential dice per wafer of course increases with decreasing die size. As such, it is useful for this reason, among others (e.g., conductor length, parasitic impedance), to arrange the physical layout of the integrated circuit so that related circuit blocks are placed closely together. In the context of RAM 18, this concept translates into the placement of the appropriate peripheral circuitry involved in accessing memory cells of memory array 20 (i.e., addressing, data communication, precharge, etc.) adjacent to memory array 20.

Figure 3:
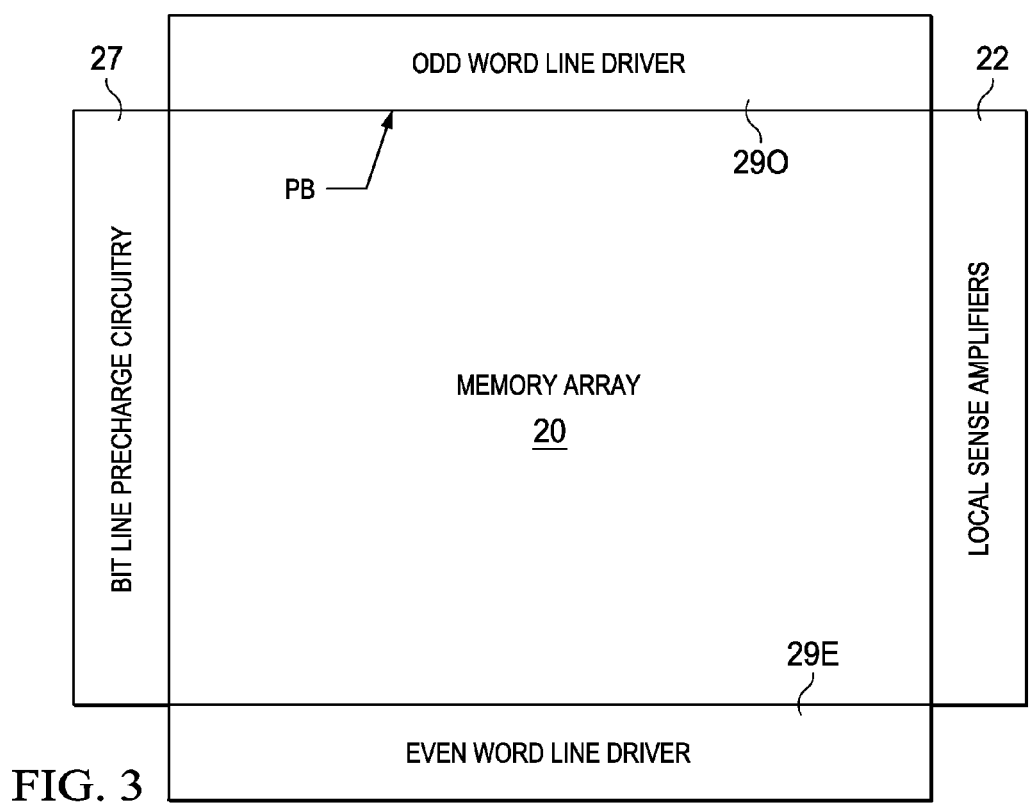
FIG. 3 is a simplified layout, in block form, of circuitry in the random access memory of FIG. 2, according to embodiments of the invention.

FIG. 3 illustrates, in general terms, an example of the physical layout of portions of RAM 18 at the surface of an integrated circuit die. As shown in FIG. 3, certain peripheral circuitry is arranged at peripheral boundary PB of memory array 20. For purposes of this description, peripheral circuitry refers to those circuits, constructed of transistors and/or other circuit elements and devices, that have functions other than serving as memory cells in memory array 20, and that are useful in the addressing, data communication, and other power and control functions associated with the operation of RAM 18. In the architecture shown in FIG. 2, the peripheral circuitry of RAM 18 includes bit line precharge circuitry 27, row decoder 23, sense amplifiers 22, write circuits 24, and column select 26, as well as other power, clock, and control circuitry useful in the operation of RAM 18.

The layout of RAM 18 shown in FIG. 3 shows certain peripheral circuits placed adjacent to peripheral boundary PB of memory array 20. In this example, even word line drivers 29E are disposed on one lateral side adjacent to memory array 20, and odd word line drivers 29O are disposed on an opposing lateral side adjacent to memory array 20. Even word line drivers 29E include driver circuitry coupled to word lines WL[m-1:0] of even-numbered rows of memory array 20, and odd word line drivers 29O include driver circuitry coupled to word lines WL[m-1:0] of odd-numbered rows of memory array 20. In the illustration of FIG. 3, the arrangement of memory array 20 and these peripheral circuits is rotated 90° from that suggested by FIG. 2, for consistency with the arrangement of individual memory cells in that array as will be described below. In this orientation, word lines within memory array 20 will run vertically across the page ("north-south"). Depending on the value of the received row address, row decoder 23 (FIG. 2) controls one of even word line drivers 29E or odd word line drivers 29O to energize the corresponding word line for the selected row. For optimum performance, it is useful for word line drivers 29E, 29O to be located adjacent to memory array 20.

Also in this layout of FIG. 3, bit line precharge circuitry 27 is disposed adjacent to memory array 20 on a side orthogonal to that of word line drivers 29E, 29O, and local sense amplifiers 22 are disposed adjacent to memory array 20 on the opposing side from bit line precharge circuitry 27. As described above, bit line precharge circuitry 27 and local sense amplifiers 22 are connected to bit line pairs BL[n-1:0], which run across the page in an orthogonal direction ("east-west") relative to word lines WL[m-1:0] within memory array 20. Again, for optimum performance in this architecture, it is useful for bit line precharge circuitry 27 and local sense amplifiers 22 to be located adjacent to peripheral boundary PB of memory array 20.

Figure 4A:
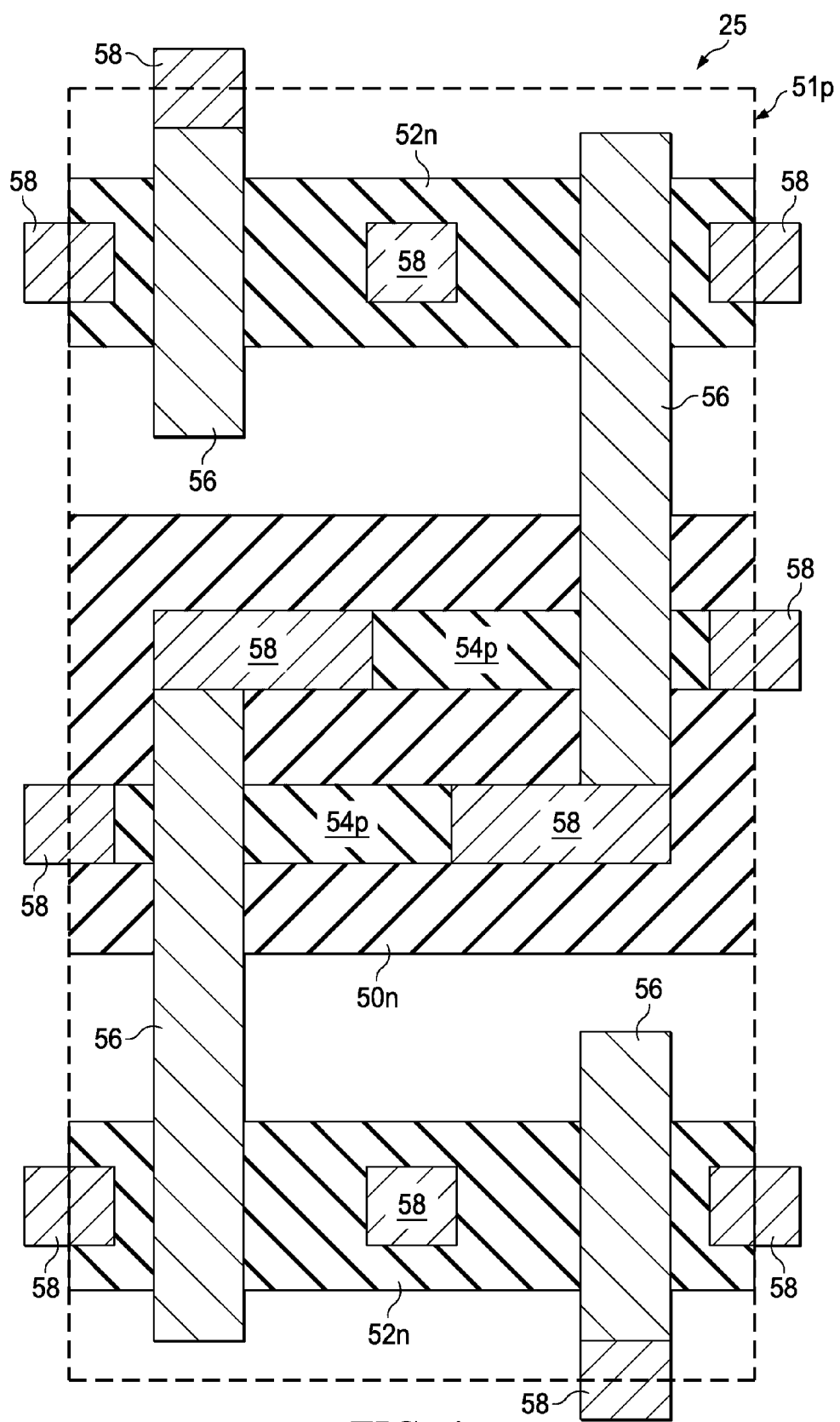
FIGS. 4a and 4c show, in plan view, the layout of a memory cell in the random access memory of FIGS. 2 and 3, according to embodiments of the invention.

The construction of memory cells 25 of memory array 20 in RAM 18, according to embodiments of this invention, will now be described in connection with FIGS. 4a through 4c. Of course, the particular arrangement of structural elements within memory cell 25 can vary, depending on the desired layout and implementation (as well as the memory type, or logic function, of the array being realized). Memory cell 25 of FIG. 4a is constructed of CMOS technology, and as such includes n-well 50n within which p-channel MOS transistors are constructed; conversely, p-type conductivity regions 51p are disposed on either side of n-well 50n, into which n-channel MOS transistors are constructed. In a twin-well process, p-type regions 51p will be formed as p-wells, and in a single-well process, p-type regions 51p will correspond to locations of the surface of a p-type substrate.

Two active regions 54p are formed into the surface of n-well 50n, as defined by isolation dielectric (not shown) disposed at the surface of n-well 50n, in the conventional manner. Polysilicon gate electrodes 56 cross over each of active regions 54p, and define the location of p-channel MOS transistors as will be described below. Contact openings 58 are defined to make contact to active regions 54p within n-well 50n (as well as to active regions in the neighboring memory cell 25); two contact openings 58 are elongated, and serve as shared contacts to both of an instance of active region 54p and an instance of polysilicon gate electrode 56. Portions of active region 54p that do not underlie polysilicon gate electrode 56 are heavily doped p-type, and serve as source and drain regions for the p-channel MOS transistors.

Active regions 52n are also formed into each of p-type regions 51p of memory cell 25, on either side of n-well 50n. The locations of active regions 52n are defined by isolation dielectric in the conventional manner. Two polysilicon gate electrodes 56 also cross over each active region 52n; one of the pair of polysilicon gate electrodes 56 is also the same gate electrode 56 as crosses over one of active regions 54p in n-well 50n. Contact openings 58 are defined over active regions 52n, and over one of the polysilicon gate electrodes 56 as shown. Portions of active regions 52n that do not underlie polysilicon gate electrodes 56 are heavily doped n-type, and serve as source and drain regions for the n-channel MOS transistors.

Metal conductors make contact to active regions 52n, 54p, and to polysilicon gate electrodes 56, through contact openings 58 in the usual manner. These metal conductors are not shown in FIG. 4a for the sake of clarity, but will be routed in the manner useful and necessary to implement each memory cell 25 in memory array 20 and to provide the corresponding interconnections.

When realized in memory array 20, adjacent memory cells 25 in both the horizontal and vertical directions will be mirror-images of memory cell 25 shown in FIG. 4a, so that the edge contact openings 58 can be shared with corresponding elements in those adjacent cells.

Figure 4B:
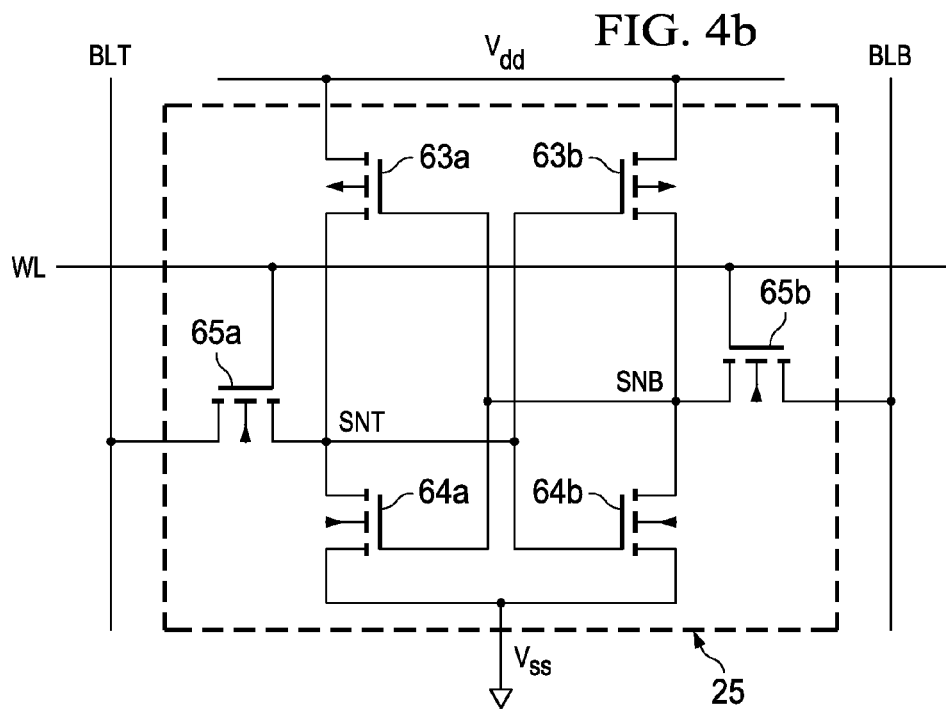
FIG. 4b is an electrical diagram, in schematic form, of the memory cell of FIGS. 4a and 4c.
Figure 4C:
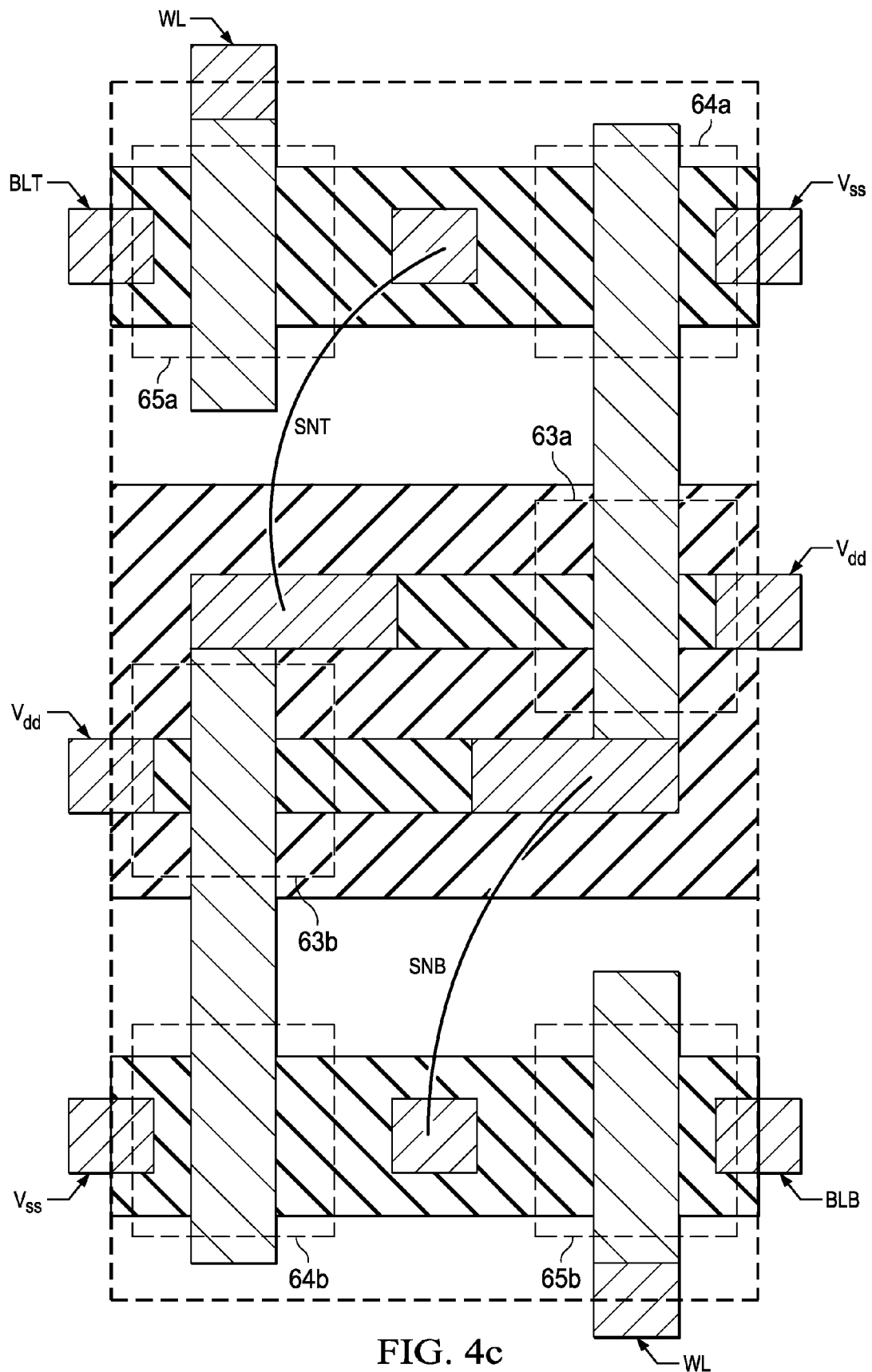

FIG. 4b shows the electrical schematic of memory cell 25, while FIG. 4c identifies the physical location of the transistors in that electrical schematic, relative to memory cell 25 described above relative to FIG. 4a. In the example of FIG. 4b, memory cell 25 is a conventional six-transistor (6-T) static memory cell, biased between a voltage on power supply line $V_{dd}$ and a ground reference voltage $V_{ss}$. SRAM memory cell 25 is constructed in the conventional manner as a pair of cross-coupled CMOS inverters, one inverter of series-connected p-channel load transistor 63a and n-channel driver transistor 64a, and the other inverter of series-connected p-channel load transistor 63b and n-channel transistor 64b; the gates of the transistors in each inverter are connected together and to the common drain node of the transistors in the other inverter, in the usual manner. The common drain node of transistors 63a, 64a constitutes storage node SNT, and the common drain node of transistors 63b, 64b constitutes storage node SNB, in this example. N-channel pass transistor 65a has its source/drain path connected between storage node SNT and bit line BLT, and n-channel pass transistor 65b has its source/drain path connected between storage node SNB and bit line BLB. The gates of pass transistors 65a, 65b are driven by word line WL.

In operation, bit lines BLT, BLB are precharged and equalized by bit line precharge circuitry 27, typically to a high voltage (at or near power supply voltage $V_{dd}$). To access cell 25 for a read operation, word line WL is energized by the corresponding word line driver 29E, 29O, turning on pass transistors 65a, 65b, and connecting storage nodes SNT, SNB to bit lines BLT, BLB. The differential voltage developed on bit lines BLT, BLB is then sensed and amplified by the corresponding sense amplifier 22. In a write operation, the corresponding write circuit 24 pulls one of bit lines BLT, BLB low (i.e., to a voltage at or near ground voltage $V_{ss}$), depending on the data state to be written. Upon word line WL then being energized, the low level bit line BLT or BLB will pull down its associated storage node SNT, SNB, causing the cross-coupled inverters of addressed cell 25 to latch in the desired state.

FIG. 4c illustrates the physical location of the transistors of memory cell 25, with metal conductor connections for storage nodes SNT, SNB shown schematically. As evident in FIG. 4c, p-channel transistors 63a, 63b are disposed within n-well 50n, defined by the instances of polysilicon gate electrodes 50n crossing over active regions 54p, 54p. The active region 52n within each instance of p-type regions 51p includes one of pass transistors 65 and one of n-channel drive transistors 64, with the intermediate contact opening connected to one of the storage nodes SNT, SNB. As evident from FIG. 4c, the orientation of memory cell 25 is rotated 90° from the orientation of array 20 in FIGS. 2 and 3. In other words, in the arrangement of FIGS. 4a and 4c, word lines WL will run vertically, and bit lines BLB, BLT will run horizontally.

As mentioned above, proximity effects in modern submicron integrated circuits such as integrated circuit 10 cause the transistors of memory cells 25 at or near the peripheral boundaries of memory array 20 to differ in performance from transistors in memory cells in the interior of memory array 20. In conventional memory integrated circuits, peripheral circuits placed adjacent to the memory array (similarly as in the arrangement of FIG. 3) are realized by transistors and passive devices that physically differ from those used to realize the memory cell devices, which necessarily results in proximity effects for memory array devices near the array boundaries. As such, many modern memory integrated circuits include "dummy" memory cells disposed at the peripheral boundary of the memory array, which serve to present the "live" memory cells at array edges with a similar environment (in the proximity effect sense) as interior memory cells. To the extent that the peripheral circuitry causes proximity effects, those effects affect only the dummy memory cells, and thus have no effect on the operation of the memory itself. Of course, additional die area is required in these conventional memory integrated circuits to implement these dummy cells.

According to embodiments of this invention, peripheral circuitry located adjacent to peripheral boundary PB of memory array 20 is realized by transistors and other devices (resistors, capacitors, conductors) that have a physical layout matching that of memory cells 25 in memory array 20. By using this construction, memory cells 25 at the edge of memory array 20 are not subjected to proximity effects—the matching layout of peripheral circuitry devices immediately adjacent to memory array 20 ensures that the edge memory cells 25 are constructed and behave similarly as do memory cells 25 in memory array 20 interior to those edge cells. As the distance from peripheral boundary PB of memory array 20 increases, the construction of the peripheral circuitry can then vary as useful to best realize the desired function.

As discussed above in connection with the Background of the Invention, different physical mechanisms can cause proximity effects, in the same integrated circuit. According to this invention, it has been realized that the distance from peripheral boundary PB, over which proximity effects are caused at edge memory cells, varies among the different physical structural levels of integrated circuit 10. In one example of the construction of integrated circuit 10, it has been observed that the proximity effect distance of the well level is greater than the proximity effect distance of the active region level (i.e., isolation structures), which in turn is greater than the proximity effect distance of the polysilicon level (i.e., gate structures), which in turn is greater than the proximity effect distance of the contact level. Embodiments of this invention take these variations into account in the physical construction of peripheral circuitry disposed adjacent to peripheral boundary PB of memory array 20.

Figure 5:
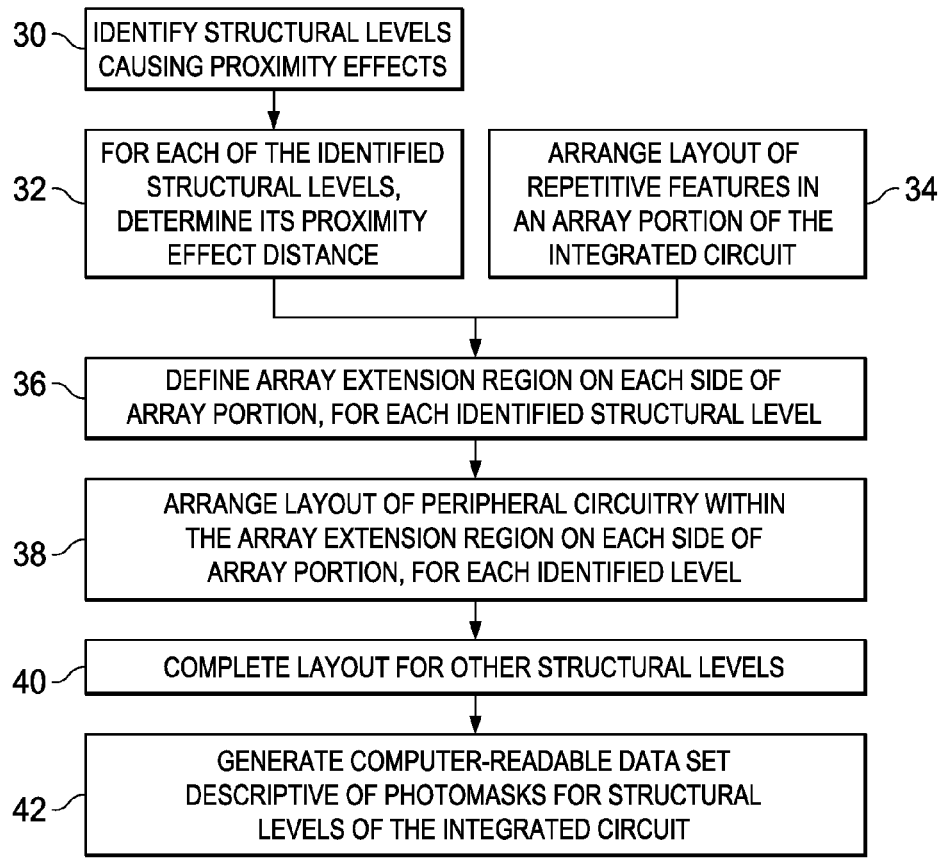
FIG. 5 is a flow diagram illustrating a method of generating a layout of the random access memory in the integrated circuit of FIG. 1, according to embodiments of this invention.

A generalized method of arranging the physical layout of an integrated circuit including an array structure such as memory array 20 of RAM 18 of integrated circuit 10, to which reference will be made by way of example, will now be described in connection with FIG. 5. More specifically, this method of FIG. 5 is directed to the layout and generation of photomasks, which of course are arranged to define the physical layout of the eventual integrated circuit 10. It is contemplated that some or all of the steps of this method will generally be carried out by way of a computer system executing computer-aided-design software tools, particularly such tools useful in generating integrated circuit layouts from electrical schematic representations. Of course, initial layout design of memory cells 25 is often optimized interactively by experienced design engineers, considering that the area consumed by a single memory cell 25 will be replicated thousands, if not millions, of times in the resulting integrated circuit 10. In any event, according to embodiments of this invention, those processes involving defining of the layout of the integrated circuit will typically be performed using a modern computer-aided-design system.

In process 30, those physical levels of eventual integrated circuit 10 that cause proximity effects are identified. This identification may be based on past experience with a particular manufacturing technology, based on characterization of previously fabricated similar integrated circuits, or the like. Typically, these identified structural levels will be those for which photomasks are to be generated, and as such those levels that are involved in the layout of integrated circuit 10.

For the example of memory array 20 and memory cells 25 described above, these identified structural levels include the n-well level, active region level (i.e., the placement of isolation structures that define the active regions), the gate level, and the contact level. Each of these structural levels, in this example, are believed or have been observed to present proximity effects evident in performance variation of transistors or other integrated circuit elements. Other structural levels in integrated circuit 10 are, conversely, either determined or deemed to not involve or be vulnerable to proximity effects. Of course, the particular levels that cause proximity effects may vary among manufacturing technologies.

Following process 30, process 32 then determines, for each of the identified proximity-effect structural levels from process 30, the proximity effect distance for that level. It is contemplated that, through characterization, experience with previous devices, or theory, design personnel can determine or calculate a distance over which variations in structure at a given structural level will cause unacceptable proximity effects at a transistor or other device. Theoretically, vanishingly small proximity effects can be caused by variations in features at distances well beyond the proximity effect distance determined in process 32. From a practical standpoint, though, the proximity effect distance determined in this process 32 will correspond to the distance beyond which the proximity effects caused by these feature variations in this level are within a given tolerance level for the manufacturing technology being used.

The layout of repetitive features in the array portion of integrated circuit 10 is arranged in process 34, generally by way of a computer-aided design tool as discussed above. These repetitive array features are, of course, the memory cells of memory arrays, the logic cells of logic arrays, and such other repetitive features that are to be arranged in an array and to which embodiments of this invention are to be applied. In this example of RAM 18, the layout arranged in process 34 corresponds to the layout of memory cell 25 as described above relative to FIGS. 4a through 4c. Process 34 is independent of processes 30, 32, and thus may be performed in advance of processes 30, 32 or separately and independently therefrom.

Process 36 obtains the results of processes 30, 32 regarding the proximity effect distances of the identified structural levels, for example by accessing stored information in a computer-readable database or the like, and also the layout of the repetitive feature arranged in process 34, and defines an array extension region for each structural level on each side of the array, within which the repetitive features for that level will be constructed in integrated circuit 10. In a general sense, process 36 determines the array extension region for each structural level identified in process 32, in terms of integral multiples of the repetitive feature defined in process 34. In the memory array example of FIG. 3, the array extension regions determined in this process 36 establish the distance from peripheral boundary PB, for each structural level, over which the structural features realizing the peripheral circuitry in that structural level are to be arranged in the same pattern as in memory cells 25. Features in the identified structural levels located beyond the array extension regions defined in process 36 may be arranged in any manner desired by the designer, as such features are sufficiently far away so as to not cause unacceptable proximity effects at the edge memory cells 25 or other repetitive feature. As mentioned above, for the example of memory array 20 of RAM 18, the array extension regions determined in process 36 are expressed as a number of memory cells 25 beyond peripheral boundary PB, for each level.

It has been observed that the proximity effect distance will vary among the structural levels identified in process 30. For the example of memory cell 25 shown in FIGS. 4a through 4c, it has been observed that structural variations in the n-well level (i.e., as realized by n-well 50n) have effect over a longer distance than do variations at the active region level (i.e., as realized by active regions 52n, 54p), which in turn have effect over a longer distance than do variations at the gate level (i.e., as realized by polysilicon gate electrodes 56), which in turn have effect over a longer distance than do variations at the contact level (i.e., as realized by contact openings 58).

Figure 6A:
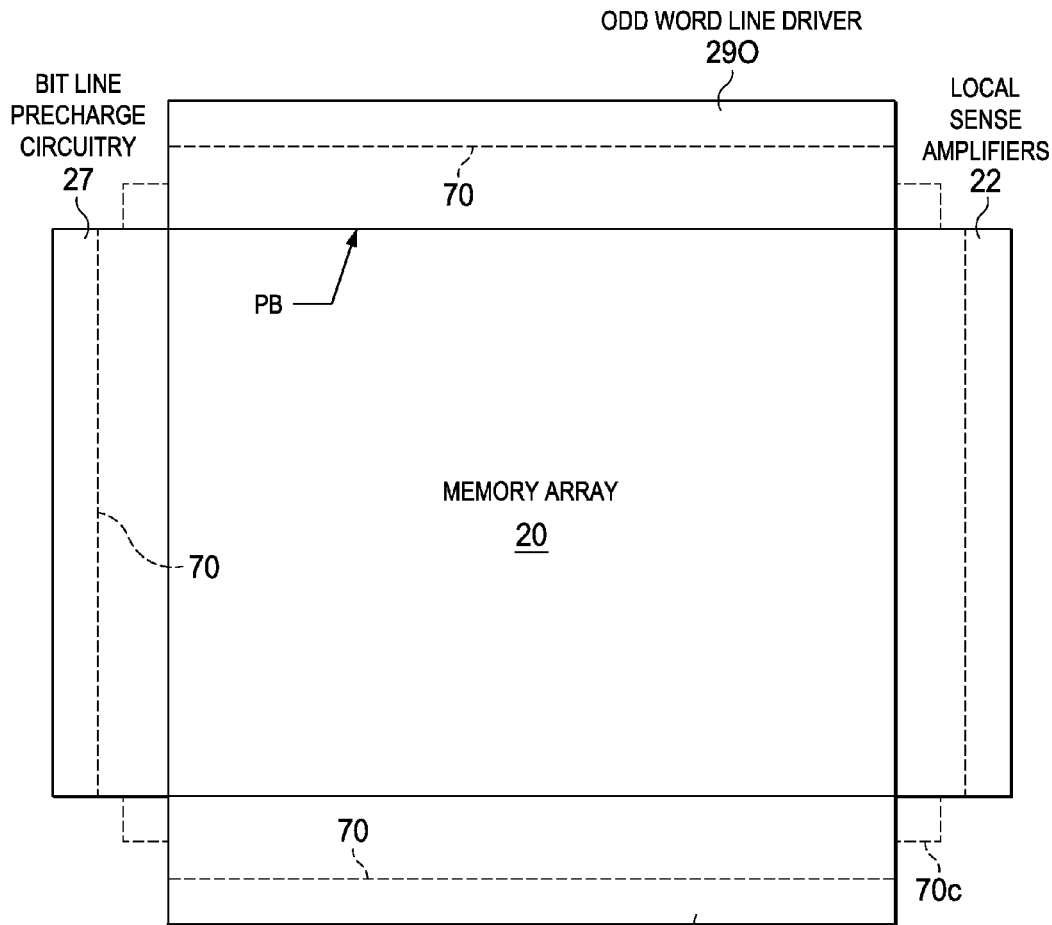
FIG. 6a is a simplified layout, in block form, of circuitry in the random access memory of FIG. 2 including an array extension region, defined according to embodiments of the invention.

According to embodiments of this invention and for the example of RAM 18 of FIG. 3, these proximity effect distances determined in process 36 define the distance from peripheral boundary PB, on each side of memory array 20, that the various peripheral circuitry must conform to the layout of memory cell 25 in each structural level. FIG. 6a illustrates this concept by way of array extension region 70 extending into the peripheral circuitry on each side of memory array 20. This array extension region 70 indicates the portion of the layout of the peripheral circuitry within which the layout must conform to the layout of memory cells 25, for the one of the identified structural levels having the largest proximity effect distance being addressed. Those structural levels having shorter proximity effect distances need only to conform with the layout of memory cells 25 over a shorter distance from peripheral boundary PB within array extension region 70. For example, local sense amplifiers 22 on the right-hand side of memory array 20 must be laid out, for at least one structural level according to the same layout as in memory cell 25 for the number of widths of memory cell 25 that fall within array extension region 70. Similarly, the layout of other peripheral circuits on the other sides of memory array 20 is constrained to match the layout of memory cells 25 in that worst-case structural level within the portion of array extension region 70 falling within that circuit region.

In those cases in which the repetitive feature is not square, but is rectangular, the number of repetitive features within the array extension region 70 may vary depending on the side of the array being considered. Memory cell 25 shown in FIGS. 4a and 4c is an example of such a repetitive feature. For example, if the aspect ratio of the repetitive feature is 2:1, the number of features within the array extension region on one side of the array may nominally be twice that relative to an orthogonal side of the array. In addition, some proximity effect mechanisms depend on the direction of current flow in the MOS transistors of the repetitive features (e.g., memory cells 25), and will be reflected in differing proximity effect distances in different directions relative to the array. Furthermore, as shown in the example of FIG. 6a, corner memory cells 25 are also subject to proximity effects, and as such corner array extension region 70c must be provided in those corners, extending in both the horizontal and vertical directions (but perhaps only to different distances, as shown).

In process 38, the layout of each peripheral circuit within the array extension regions 70 is defined, for each structural level identified in process 30 and to the extent of the array extension region 70 determined in process 36. As described above, it is contemplated that this layout will be carried out by way of a computer system executing the appropriate computer-aided design software tools, under the direction of a design engineer or other appropriate personnel.

For the example of memory cell 25 of RAM 18, the execution of process 36 on one side of memory array 20 will be described in further detail for the structural levels identified in process 30, namely the n-well, active, gate, and contact levels, relative to FIGS. 6b through 6e, for the construction of memory cells 25 described above relative to FIGS. 4a and 4c. In this example, the portion of array extension region 70 shown will be along the right-hand side of memory array 20 of FIG. 6a, considering that bit lines run horizontally and word lines vertically in the layout of memory cell 25 in FIGS. 4a and 4c. A component array extension region for each of these identified structural levels will be constructed to correspond to the following proximity effect distances, as converted into numbers of memory cells 25 by process 36:

| Structural Level | Number of cells (horizontal) |
|---|---|
| n-well 50p | 8 |
| active regions 52n, 54p | 4 |
| gate 56 | 2 |
| contact 58 | 1 |

The numbers of memory cells 25 defining component array extension regions $70_x$ for these structural levels on the top and bottom sides of memory array 20 of FIG. 6a will, of course, depend on the proximity effect distances for those sides (i.e., as affected by the direction of transistor conductivity within memory cells 25), and also on the aspect ratio of memory cell 25.

Figure 6B:
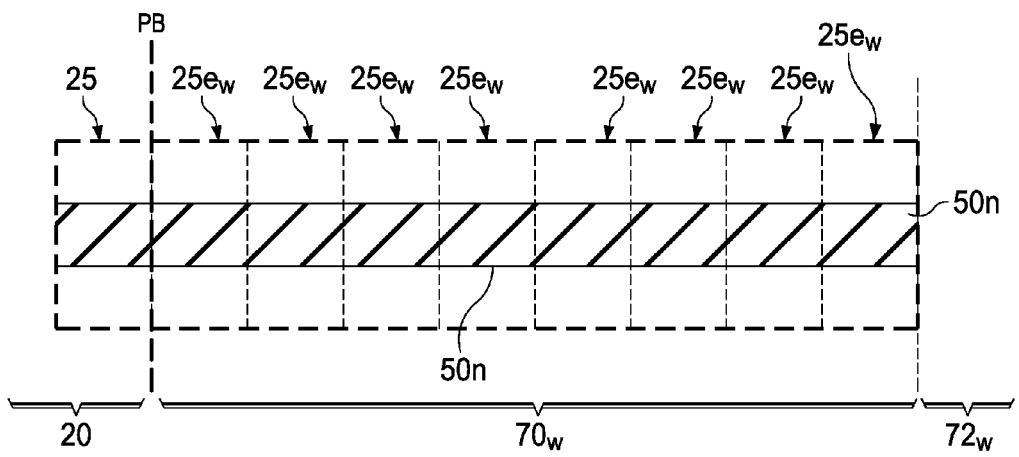
FIGS. 6b through 6e illustrate, in plan view, the layout of array extension regions based on the memory cells of FIGS. 4a and 4c, according to embodiments of the invention.

FIG. 6b illustrates the arrangement of array extension region $70_w$ for the n-well level only, as shown at the end of one row of memory cells 25 within memory array 20 (i.e., running from left to right in FIG. 6a). As evident from FIG. 6b, memory cell 25 at this edge of memory array 20 includes one instance of n-well 50n extending across its width. To create array extension region $70_w$ in this level, n-well 50n continues in the same shape for at least eight instances of pseudo-cell $25e_w$ outside of memory array 20 from peripheral boundary PB, as shown in FIG. 6b. Pseudo-cells $25e_w$ simply refer to locations of the layout of integrated circuit 10 that resemble memory cells 25 at the well structural level (and not necessarily in other levels), and that have the same dimensions. In normal region $72_w$ beyond array extension region $70_w$, instances of n-well 50n need not continue and can be arranged as desired by the designer to implement the corresponding peripheral circuit function (e.g., local sense amplifiers 22 in the arrangement of FIG. 6a). Because the proximity effect distance is greatest in this well level, array extension region 70 corresponds to array extension region $70_w$ in this well level.

Figure 6C:
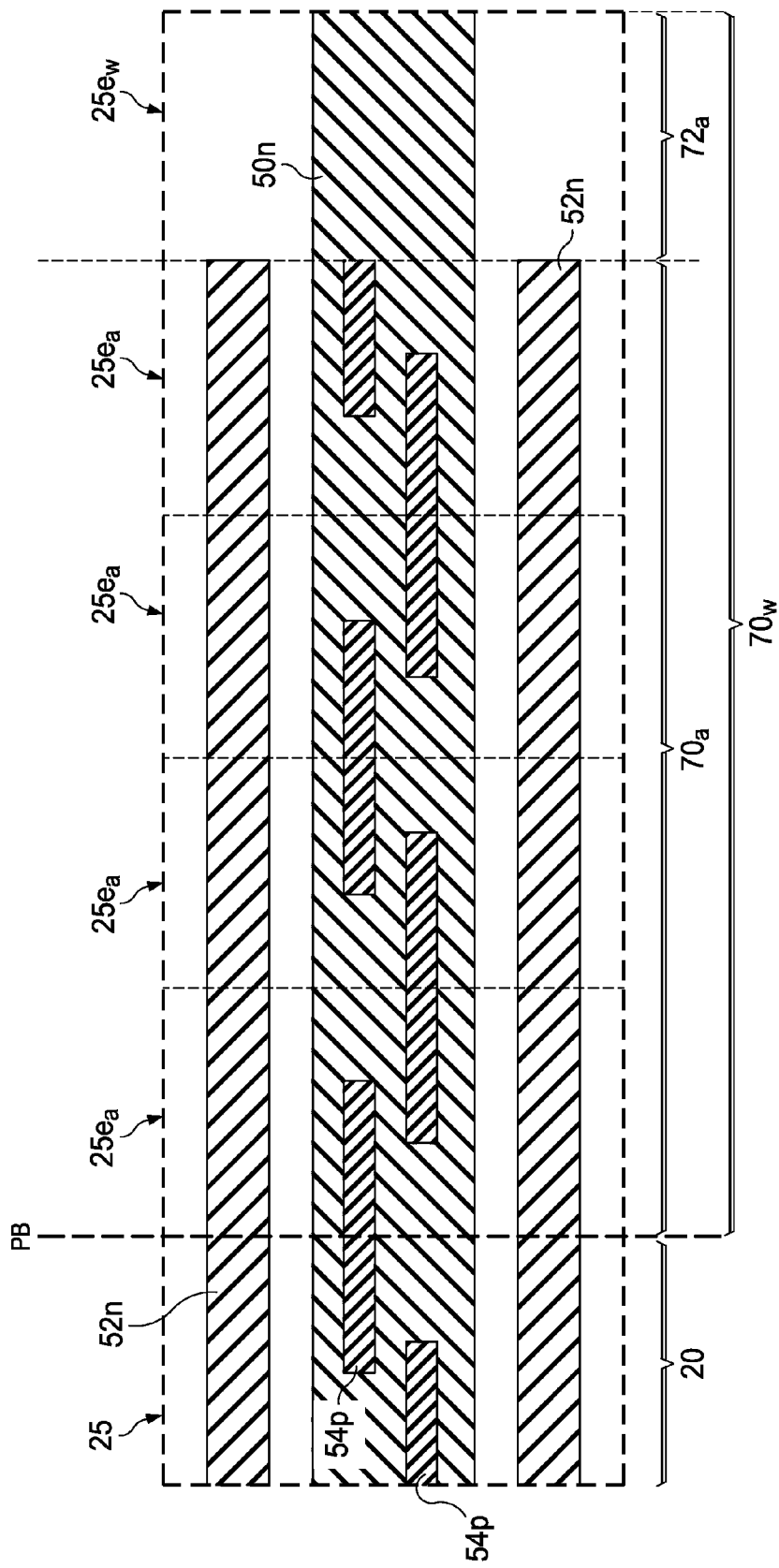

FIG. 6c illustrates the arrangement of an example of array extension region $70_a$ for the active region structural level, which in this example overlies array extension region $70_w$ for the well level. As shown in this FIG. 6c, array extension region $70_a$ for the active region level extends for four instances of pseudo-cells $25e_a$ from peripheral boundary PB of memory array 20. Array extension region $70_w$ for the well level extends beyond array extension region $70_a$ for the active level, because of the longer proximity effect distance due to well-level layout variations than at the active region level. Within array extension region $70_a$, the pattern and arrangement of n-type active regions 52n and p-type active regions 54p continue in the same manner as within memory array 20 in this level. As evident from FIG. 6c, the arrangement of active regions 54p alternate in mirror image fashion in adjacent memory cells 25 and pseudo-cells $25e_a$. Because this mirror image arrangement is also present within memory array 20, proximity effects are similarly prevented in the edge memory cell 25 at this level in this example of array extension region $70_a$. The layout of active regions 52n, 54p may be arranged as desired for the peripheral circuit in normal region $72_a$, beyond array extension region $70_a$.

Figure 6D:
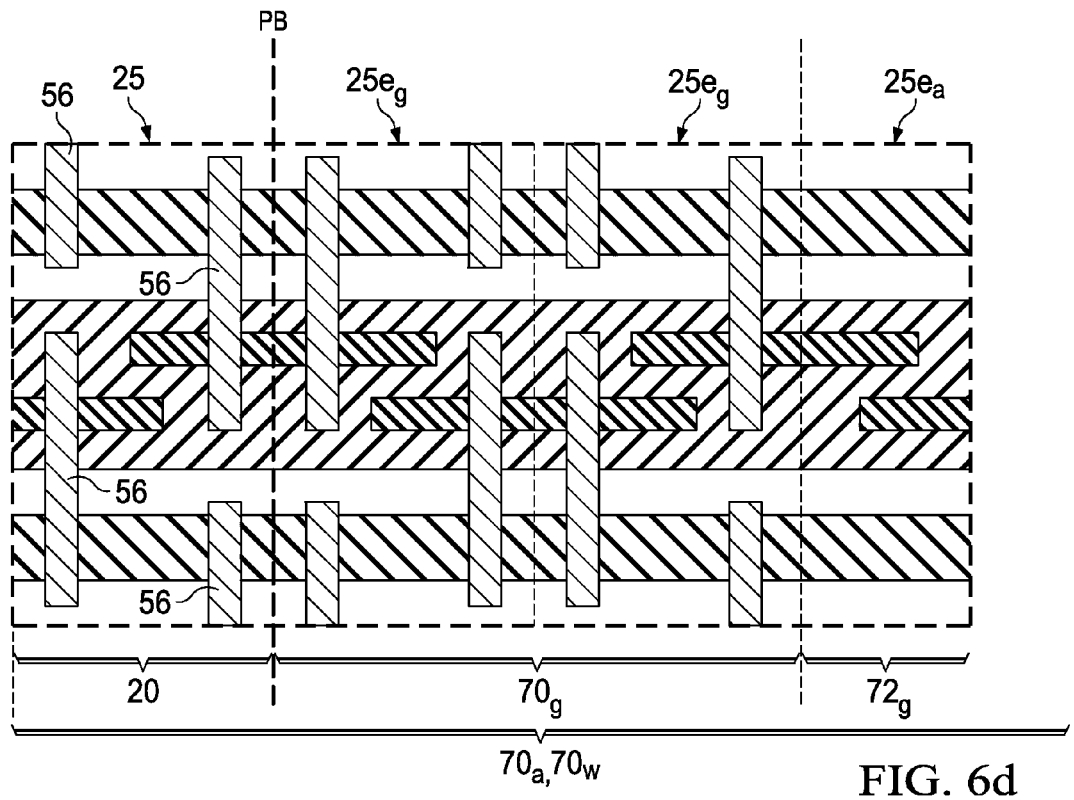

An example of array extension region $70_g$ at the gate level is illustrated in FIG. 6d. In this example, gate level array extension region $70_g$ extends for two instances of pseudo-cells $25e_g$ from peripheral boundary PB of memory array 20, which is within array extension region $70_w$ for the well level and array extension region $70_a$ for the active level in this example. The pattern and arrangement of polysilicon gate elements 56 in pseudo-cells $25e_g$ within array extension region $70_g$ is constrained to match that within memory cells 25, again with adjacent cells 25, $25e_g$ as mirror images of one another. The layout of polysilicon gate electrodes 56 in normal region $72_g$ beyond array extension region $70_g$ may be arranged as desired for the peripheral circuit.

Figure 6E:
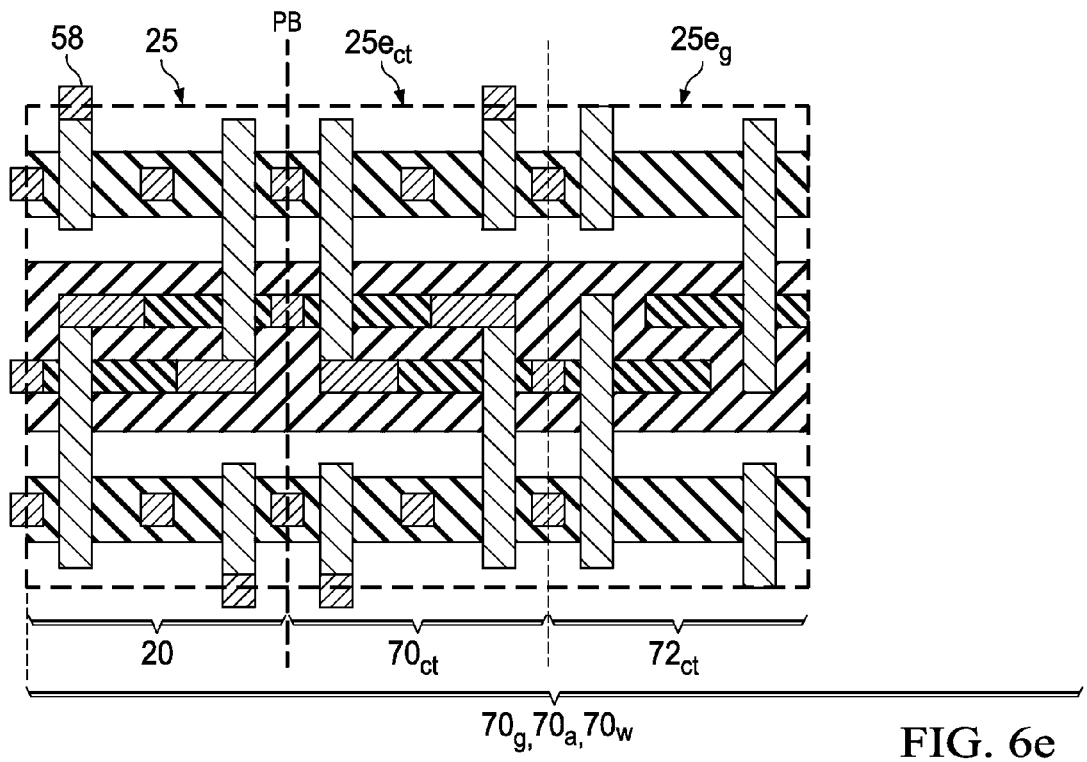

FIG. 6e illustrates the construction of array extension region $70_{ct}$ at the contact level in this example, in which contact level array extension region $70_{ct}$ extends for a single instance of pseudo-cell $25e_{ct}$ from peripheral boundary PB of memory array 20. This single pseudo-cell $25e_{ct}$ is disposed within each of array extension regions $70_g$, $70_w$, and $70_a$ for the gate, active, and well levels, respectively. Within pseudo-cell $25_{ct}$, the pattern and arrangement of contact openings 58 is constrained to match that within memory cells 25; because only a single pseudo-cell $25_{ct}$ is necessary, this pseudo-cell $25e_{ct}$ will have a pattern of contact openings 58 that is a mirror image of edge memory cell 25. The layout of contact openings 58 in normal region $72_{ct}$ beyond array extension region $70_{ct}$ in the contact level may be arranged as desired for the peripheral circuit.

In this example, higher structural levels such as metal patterns and the like were not identified in process 30 as involving proximity effects to be minimized in the layout of integrated circuit 10. As such, the layout of structures in those levels can be optimized for functionality and performance reasons, constrained of course by the transistors and other structures within array extension region 70. Referring back to FIG. 5, the layout of these other structural levels of integrated circuit is carried out in the conventional manner in process 40.

In process 42, once the layout of all structural levels and other levels to be realized has been defined, the computer system executing computer-aided design software tools and the like generates the appropriate computer-readable data set that is descriptive of the photomasks to be used in the manufacture of integrated circuit 10. This computer-readable data set can be generated in the conventional format as used by photomask "writing" or other photomask generation tools, either directly or by way of additional processing and conversion. An example of the process of generating such a photomask pattern data set is described in commonly assigned U.S. Pat. No. 7,765,516 B2, incorporated herein by reference. Upon creation of those photomasks, of course, integrated circuit 10 can then be manufactured, according to the circuit feature layout arranged according to embodiments of this invention.

FIG. 7 illustrates an example of the layout of a portion of memory array 20 and a portion of local sense amplifier circuitry 22 for RAM 18 of FIG. 6a, for a row of memory cells 25 and pseudo-cells $25e_x$. As shown in FIG. 7, component array extension regions $70_{ct}$, $70_g$, $70_a$, $70_w$ overlap one another from peripheral boundary PB of memory array 20 along this edge. As evident in FIG. 7, array extension region 70 corresponds to the largest of the component array extension regions $70_{ct}$, $70_g$, $70_a$, $70_w$, which in this case is well-level array extension region $70_w$. FIG. 7 also illustrates the variation in each of these structural levels outside of their array extension regions $70_{ct}$, $70_g$, $70_a$, $70_w$, as useful in constructing the circuits for local sense amplifier circuitry 22. Of course, as evident from FIG. 6a, similar construction of the other peripheral circuits is implemented on the other three sides of memory array 20.

According to embodiments of this invention, proximity effects in regular arrays of repetitive features are greatly reduced, without the substantial cost of "dummy" memory or logic cells at the edges of arrays as in conventional integrated circuits. This cost of "dummy" cells is especially heavy for arrays of relatively small or modest size, for example as often used in embedded memories in SoC or large-scale logic circuit implementations. In addition, no additional mask levels or process steps are required to realize embodiments of this invention—only the same mask levels as otherwise necessary in the construction of the integrated circuit are required. Embodiments of this invention also enable the formation of array extension regions of different size for different levels, reducing proximity effects to a much greater extent than through the use of dummy cells, especially for those levels (e.g., well level) that generate proximity effects over relatively large distances (e.g., eight cells). Accordingly, embodiments of this invention provide the same structural context for all memory or logic cells in each array, including those cells at array edges, eliminating context-induced yield loss due to proximity effects.

While the present invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. An integrated circuit, comprising:
   an array of repetitive features in a plurality of structural levels, formed near a surface of a semiconductor body, the array of repetitive features having a peripheral boundary;
   an array extension region, disposed adjacent to and outside of the peripheral boundary of the array, the array extension region comprised of repetitive features matching those in the array in one or more of the plurality of structural levels; and
   peripheral circuitry comprising one or more devices formed in the array extension region and one or more devices outside of the array extension region.

2. The integrated circuit of claim 1, wherein the plurality of structural levels are selected from a group consisting of a well level, an active region level, a gate level, and a contact level.

3. The integrated circuit of claim 2, wherein the array extension region comprises:
   a first number of repetitive features extending from the peripheral boundary matching those in the array for a first structural level; and
   a second number of repetitive features extending from the peripheral boundary matching those in the array for a second structural level;
   wherein the first number is greater than the second number.

4. The integrated circuit of claim 3, wherein the first structural level is a lower level than the second structural level.

5. The integrated circuit of claim 1, wherein the array of repetitive features comprises an array of memory cells arranged in rows and columns;
   and wherein the peripheral circuitry comprises circuitry for accessing one or more of the memory cells in the array.

6. The integrated circuit of claim 5, wherein the array of repetitive features comprises an array of static random access memory (SRAM) memory cells.

7. The integrated circuit of claim 1, wherein the array of repetitive features comprises an array of logic cells.

8. The integrated circuit of claim 1, wherein the peripheral circuitry comprises one or more transistors formed in the array extension region and one or more transistors formed outside of the array extension region.

9. The integrated circuit of claim 1, wherein the array has at least four sides;
   and wherein the array extension region extends from the peripheral boundary on first and second opposing sides of the array.

10. The integrated circuit of claim 9, wherein the array extension region extends from the peripheral boundary on each side of the array.

* * * * *